June 8, 1926.
G. A. MONTGOMERY
SCREW THREADED JOINT
Filed April 18, 1922
1,588,128
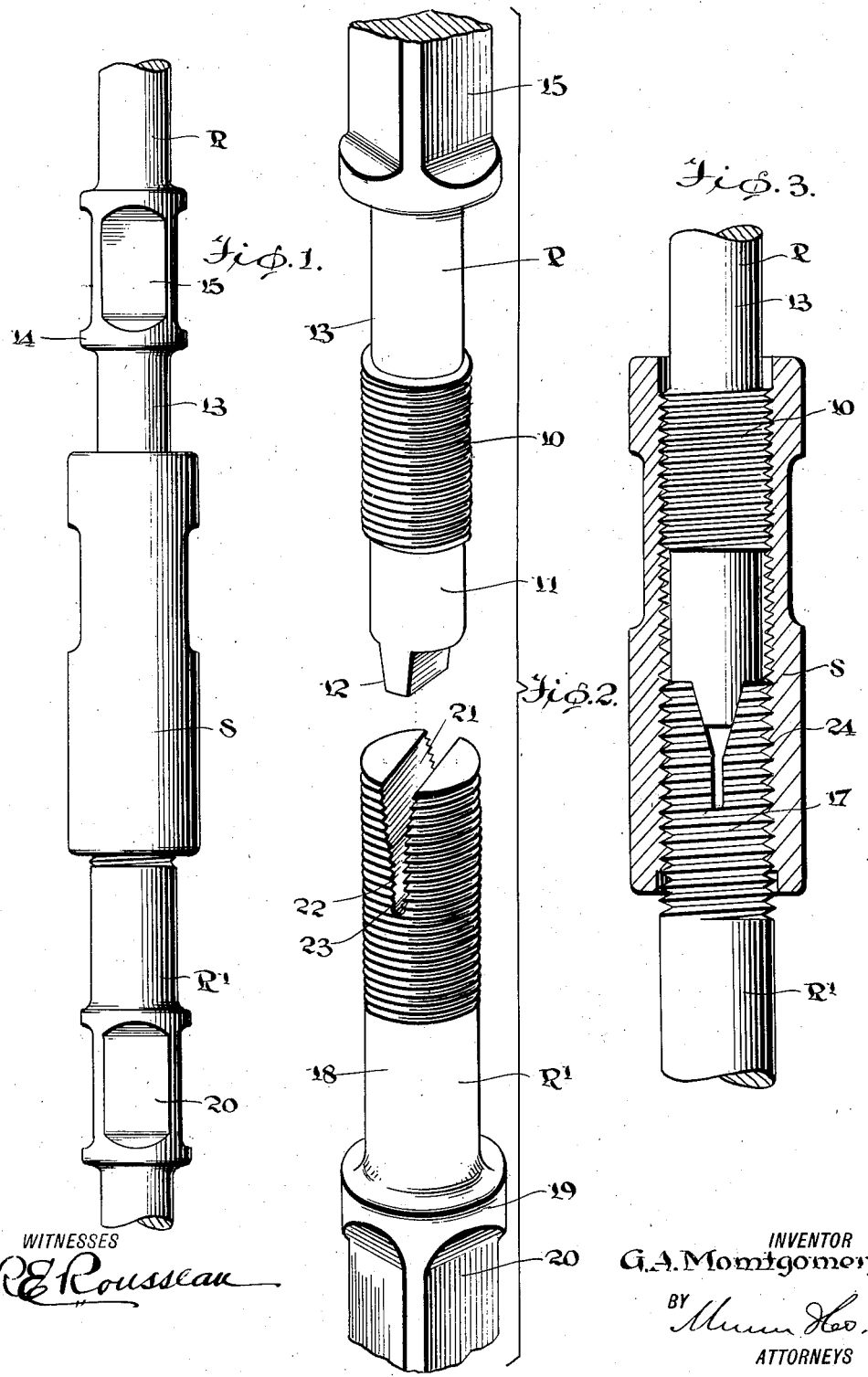
INVENTOR
G. A. Montgomery,
BY
ATTORNEYS Patented June 8, 1926.

1,588,128

UNITED STATES PATENT OFFICE.

GUSTAVUS ALFRED MONTGOMERY, OF TITUSVILLE, PENNSYLVANIA.

SCREW-THREADED JOINT.

Application filed April 18, 1922. Serial No. 554,550.

This invention relates to improvements in screw threaded joints.

The invention more particularly relates to a screw threaded joint adapted to be utilized for connecting tubular or casing sections or stems used in connection with drilling or maintaining oil wells or the like.

As is well known great difficulty is experienced in finding a suitable jointing means for connecting together casing or stem sections which prohibits at all times the parting or dividing of any of the sections. With this in view, it is the prime object of the present invention to provide an improved form of screw threaded joint with the purpose of overcoming all apparent possibilities of two members becoming parted or disconnected when secured together.

It is also an object of the invention that the number of parts composing the joint be relatively few.

It is a further object of the invention that the joint preserve a uniform interior dimension of tubular members connected thereby.

It is a still further object of the invention that two members be easily connected by said joint.

Still another object of the invention is that the joint serve to form a fluid tight connection between the connected ends of tubular members.

Other objects and objects relating to details of construction, combination and arrangement of parts will hereinafter appear in the detailed description to follow.

The invention is illustrated by way of example in the accompanying drawings, in which:—

Figure 1 is a view in side elevation of a pair of stems or rods connected together in accordance with the present invention, Figure 2 is a group view showing the specific construction of the abutting ends of the stems or rods, Figure 3 is a longitudinal sectional view of the joint shown in Figure 1, the stems being broken away at a point near the connecting sleeve.

Referring to the drawings in detail and particularly to Figures 1 to 3 inclusive, R indicates a rod or stem section and R' another similar section of a rod or stem. The rod R may be referred to as a male member in this instance, and the rod R' as the female member. The rods R and R' are secured together by a sleeve S.

More specifically the rod R consists in an enlarged threaded portion 10 below which there occurs the portion 11 corresponding in diameter to the diameter of the rod, and said portion 11 terminating in a tapered extension 12 which is blunt at its end as shown. Above the threaded portion 10 there occurs the portion 13 which likewise corresponds in diameter to the diameter of the rod R; and above this portion there may be formed a flattened portion 14 upon which a wrench may be placed for turning the rod if desired. The portion 14 may have been enlarged previously to providing the flattened faces 15 and thus forming shoulders at the ends of each flattened surface, as shown.

The rod R' or female member has an end threaded portion 17, the threads in this instance being coarser than the threads upon the portion 10 of the rod R. Immediately below the threads 17 on the member R' there occurs a portion 18 which agrees in diameter to the diameter of the rod R, and below this there may occur an enlargement 19 having the flattened surfaces 20 to which a wrench may be applied. A threaded end of the member R' is formed with a substantially V-shaped slot 21 which extends longitudinally of the rod, as shown, and which is continued into the slot portion 22, said slot portion 22 in turn terminating in a rounded end wall 23.

The sleeve S is interiorly threaded as shown at 24, Figure 3, and the threads in this instance should be uniform throughout and adapted to receive the threaded portions 10 and 17 of the members R and R' respectively. In connecting the members R and R', the sleeve S should be threaded upon the member R until the end 12 thereof is substantially flush with the lower end of the sleeve. The rod R' is now brought so that its slot 21 may be disposed under and in line with the tongue 12 of the rod R and the sleeve S is turned in a right hand direction. With the rotation of the sleeve S in this last named direction, the same will move downwardly upon the rod R' and recede from the rod R, and due to the difference of the threads 10 and 17 upon the rods R and R', respectively, the sleeve S will move at a slightly greater rate on the rod R' than it recedes from rod R and thus the extension 12 will be forced into the groove 21. The extension 12 is of sufficient thickness that upon being forced into the groove 21 it will slightly expand the end portion of the rod R' and thus make the same bind with the threads of the sleeve S. The rods R and R' when properly connected should be substantially in the positions illustrated in Figure 3 with relation to each other, and also with respect to the sleeve S and as is apparent the two rods are bound together to resist turning movement in either direction, and also to resist any strain or stress which may be imposed upon the sleeve S for turning the same in either direction; and due to being bound together in this manner the connection maintains the maximum strength for resisting longitudinal force exerted upon the rods for pulling the same apart or torsional forces attempting to unscrew the members from each other.

It may be here noted that the abutting ends of the rods R and R', shown in Figures 1 to 3 inclusive, may be cut on an angle or incline.

I claim—

A joint of the character described, comprising a continuously threaded sleeve and a pair of connected members, one threaded into each end of the sleeve, the threads upon one member being coarser than the threads upon the other member, one of said members having its abutting end provided with a longitudinal slit expanding to provide a V-shaped entrance, and the other member having its abutting end formed with a wedge shaped projection adapted to engage the said expanded entrance and expand the end of the first mentioned member into tight engagement with the threads of the sleeve when brought to engage therewith for the purpose specfiied.

GUSTAVUS ALFRED MONTGOMERY.